United States Patent [19]

Brandess

[11] Patent Number: 5,128,838
[45] Date of Patent: Jul. 7, 1992

[54] PHOTOGRAPHIC FILTER HOLDING APPARATUS

[75] Inventor: Muriel H. Brandess, Highland Park, Ill.

[73] Assignee: Visual Pursuits, Inc., Chicago, Ill.

[21] Appl. No.: 593,001

[22] Filed: Oct. 5, 1990

[51] Int. Cl.$^5$ ............................................. F21V 17/02
[52] U.S. Cl. ........................................ 362/18; 362/277;
362/319; 362/449; 362/293; 248/124
[58] Field of Search ............... 362/3, 16, 17, 18, 293,
362/449, 450, 455, 456, 457, 458, 433, 277, 280,
282, 319, 322, 323; 248/122, 124, 125, 274

[56] References Cited

U.S. PATENT DOCUMENTS

| | | | |
|---|---|---|---|
| 2,009,145 | 7/1935 | Nathan | 362/323 |
| 2,059,361 | 11/1936 | Kentworthy | 362/323 |
| 3,852,582 | 12/1974 | Lowell | 362/18 |
| 4,179,726 | 12/1979 | Aran | 362/18 |
| 4,187,531 | 2/1980 | Lowell et al. | 362/18 |
| 4,298,920 | 11/1981 | Gluck et al. | 362/293 |
| 4,504,888 | 3/1985 | Rosenthal | 362/18 |
| 4,600,976 | 7/1986 | Callahan | 362/277 |
| 4,618,918 | 10/1986 | Zhabokrug | 362/293 |
| 4,777,566 | 10/1988 | Lowell et al. | 362/18 |

*Primary Examiner*—Richard R. Cole
*Attorney, Agent, or Firm*—Mark I. Feldman

[57] ABSTRACT

A universal, filter holding apparatus provides an adjustable filter assembly which can hold different size filters. The versatile filter assembly is also constructed and arranged to facilitate tilting, pivoting, and rotation of the filter in different directions and can be guided upon a boom towards or away from a light source, as desired by the photographer. In the preferred form, the filter assembly has symmetrical L-shaped slide members which slide towards or away from each other along the rails of a track to expand or contract the size and span of the filter assembly. The filter assembly can also have a rotatable bracket which can be secured to and rotate the filter. The filter can have an aperture and grommet to facilitate its attachment to the bracket via a fastener. The filter assembly can further be equipped with an articulated tiltable unit which can slide upon and be rotated about the boom to further adjust the position of the filter.

8 Claims, 3 Drawing Sheets

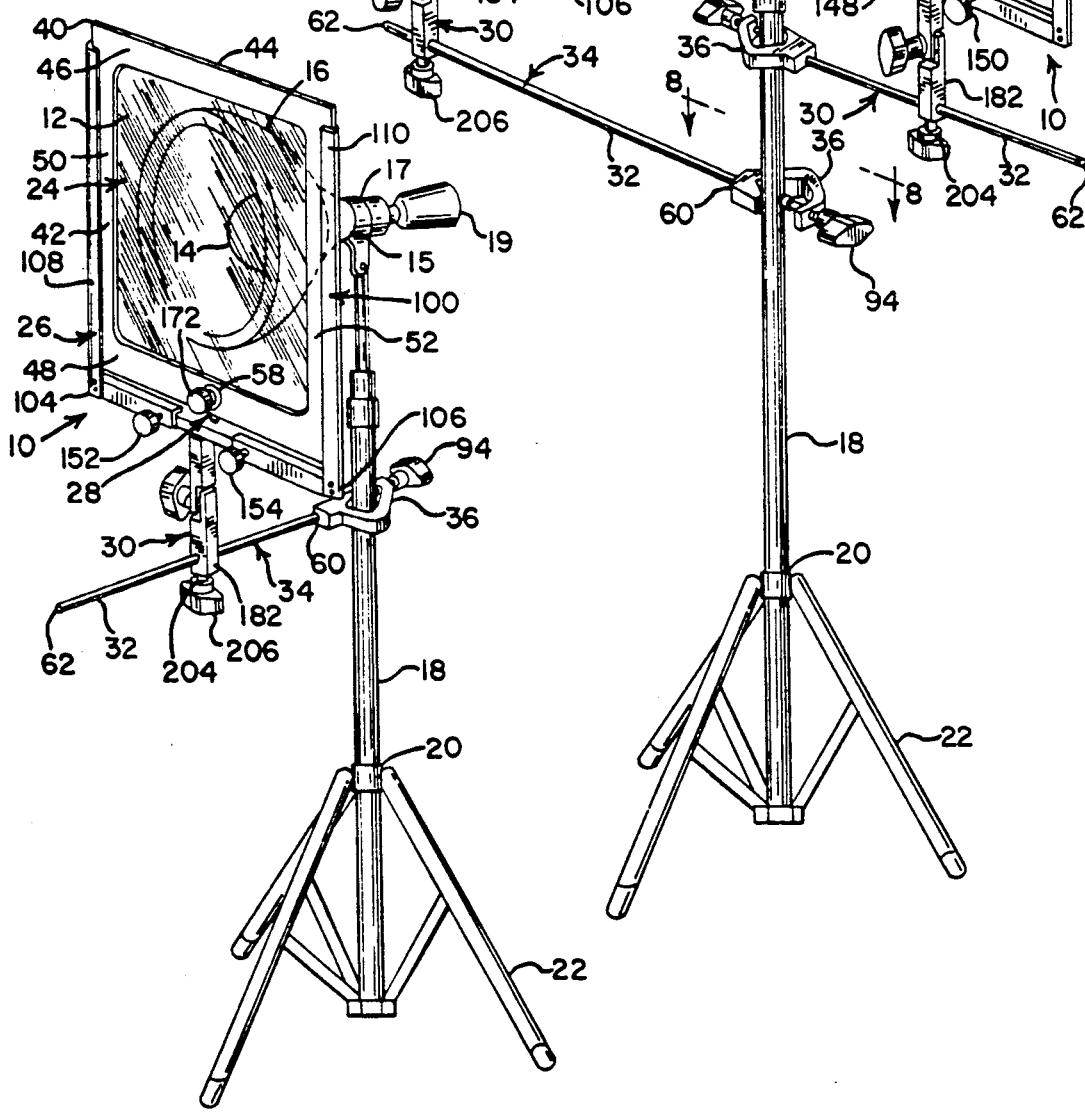

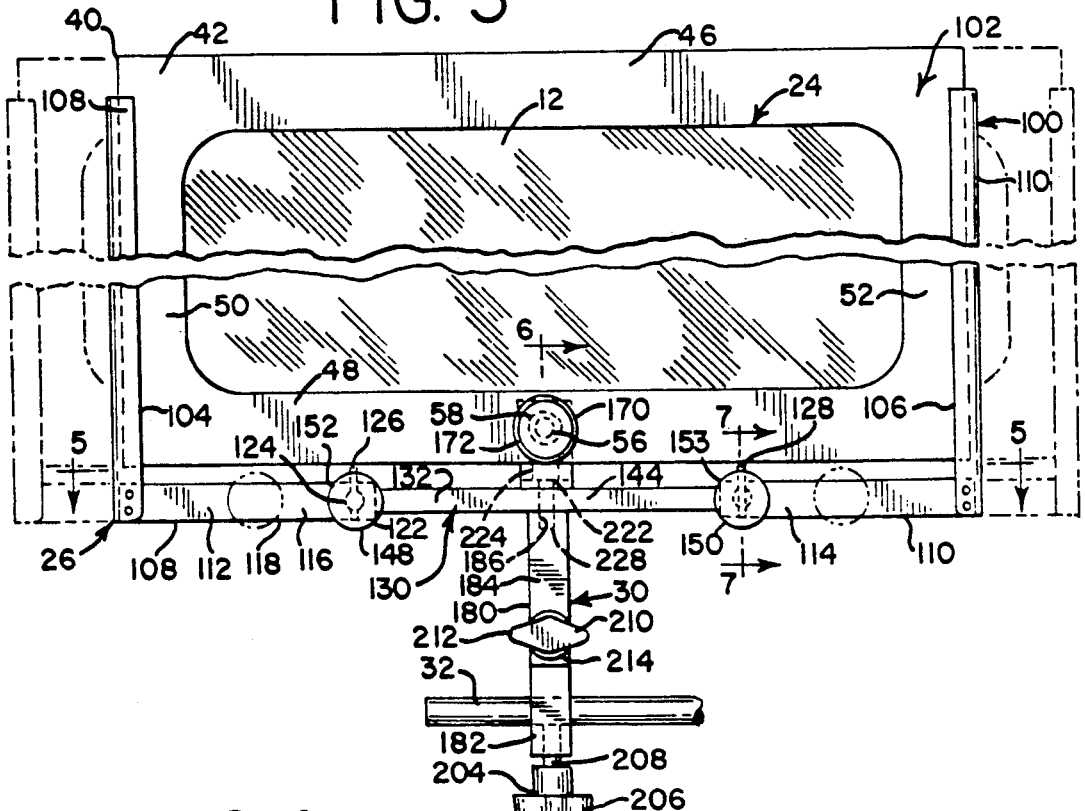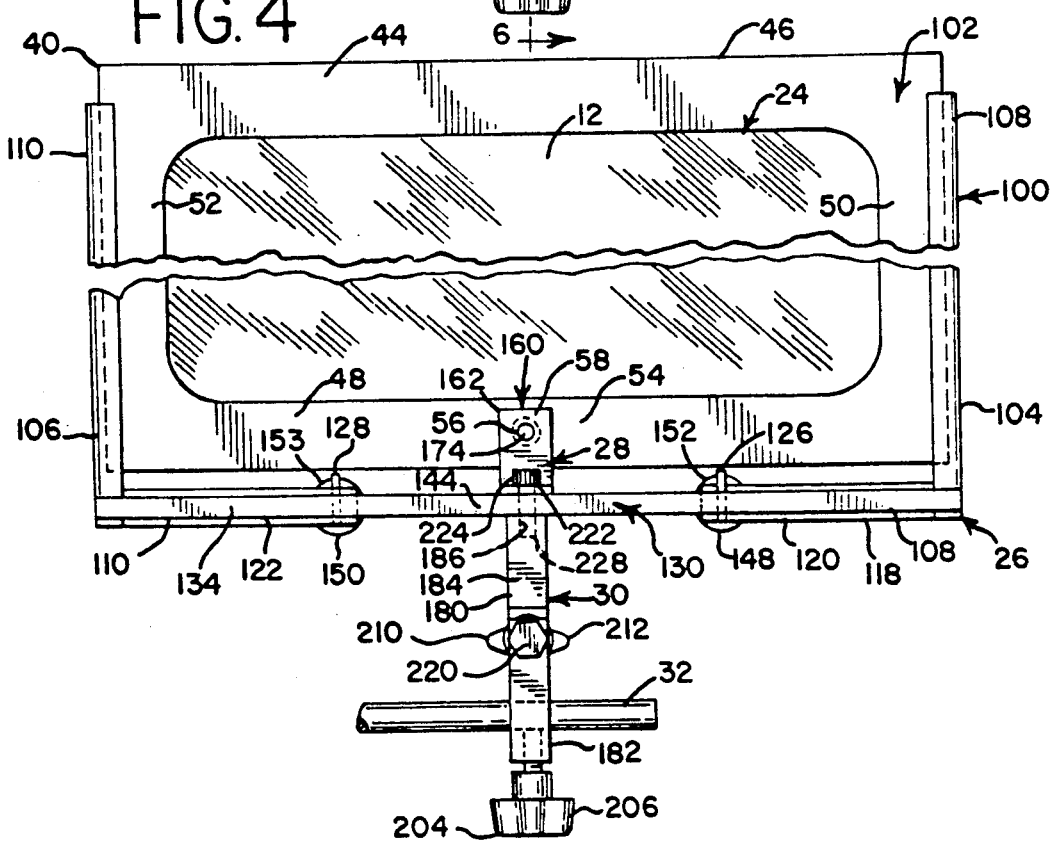

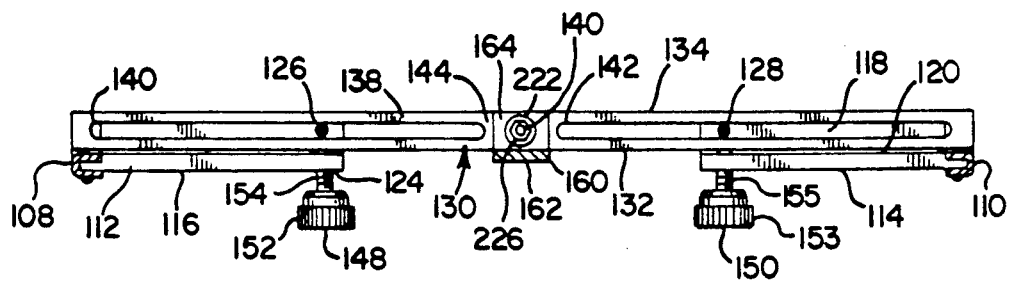
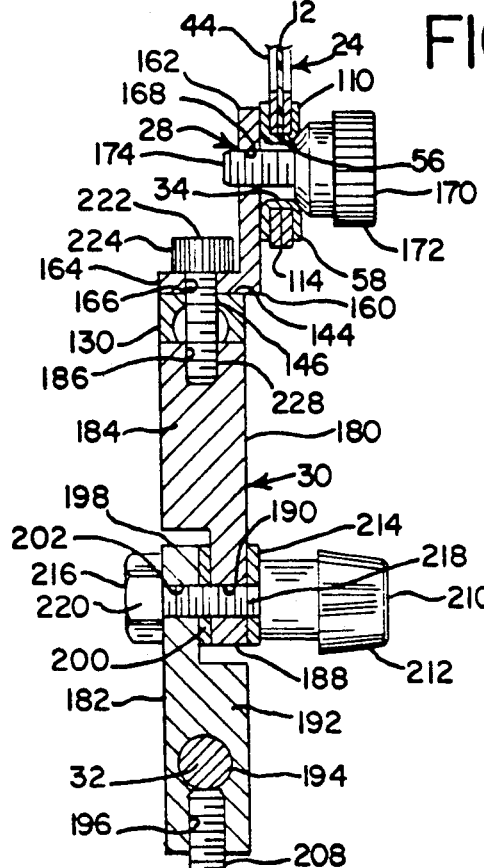
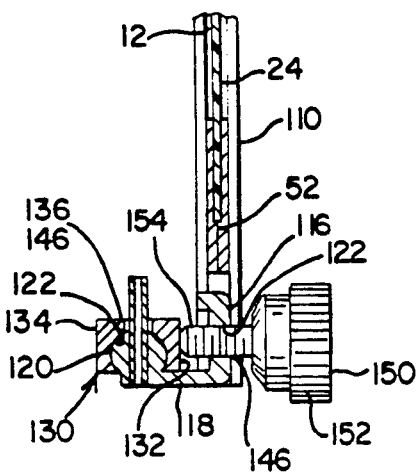
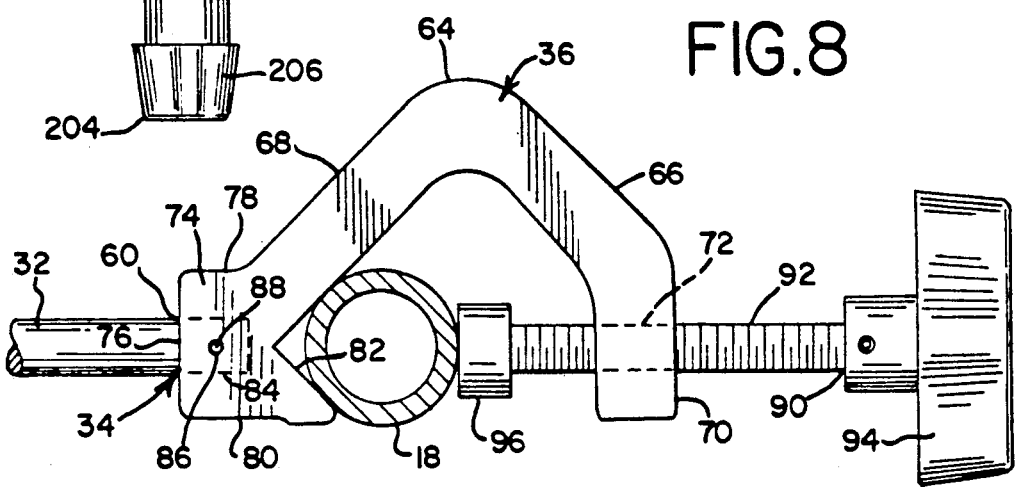

PHOTOGRAPHIC FILTER HOLDING APPARATUS

BACKGROUND OF THE INVENTION

This invention relates to photography and, more particularly, to a photographic filter holding apparatus.

Professional and experienced photographers desire to control and enhance the illumination of the subject being photographed in studios and outdoors, by the use and special placement of various photographic equipment, such as light units, umbrellas, booms, filters, reflectors, frames, panels, etc., to create different desired effects for group pictures, glamour portraits, executive portraits, pet pictures, and photographs of products for advertising, etc.

Many types of conventional booms are available. For example, conventional booms have been equipped with accessories, such as counterweights, swivel holders, boom clamps, EC-1 clamps, telescoping portions, handles, and/or elaborate brackets for mounting onto different diameter light stands. Many of these boom clamps and brackets are difficult to use or require disassembly of parts to remove the boom from a light stand or other surface.

The use of filters can help obscure wrinkles and aging to make the subject appear younger. Filters are also used to help hide blemishes and minimize faults, improve skin tone and coloring, and highlight desired features to enhance the appearance and image of the subject.

Polarizing filters are often used by photographers to minimize glare and improve picture quality. Polarizing filters can increase color saturation and can decrease and control the intensity and amount of light being transmitted, such as to about 35%. The proper positioning of the filter enhances the appearance and illumination of the photograph and avoids exposure guesswork and bracketing at different f stops. Polarizing filters are especially useful when photographing highly reflective surfaces, such as water, glass, polished metal, jewelry, etc.

Color filters can be used to filter selected colors, such as yellow, orange, red, purple, magenta, blue, green, cyan, etc. Other filters are useful for masking, vignetting, diffusion, highlighting surface, gobo for creating shadows, etc. Filters comes in different sizes.

Prior art filter holding equipment, such as Z frames, Tota frame, Fisso arms, Smith Victor holders, Fotolight holders, fixed frames, umbrella type flexible frames, are typically bulky, clumsy, difficult to use, have limited versatility and rotation, and then not more than 180 degrees, and do not adequately clamp and tightly hold the filter. Furthermore, such prior art equipment typically holds only one size filter. These prior art filter holding equipment have met with varying degrees of success.

It is, therefore, desirable to provide an improved filter holding apparatus.

SUMMARY OF THE INVENTION

A versatile improved photographic filter assembly provides a filter holding apparatus and stand which is convenient, easy-to-use, and effective. Advantageously, the novel photographic filter assembly is adjustable in size to accommodate different size filters and can be tilted 180 degrees and rotated 360 degrees in different directions and along different axis to change the angle and amount of polarizing or other filtering. Desirably, the improved filter assembly can be easily clamped onto a light stand, lamp pole, or shelf and can be readily removed therefrom without disassembling any of its parts. Two or more of these versatile filter assemblies can be mounted on a single rod, if desired by the photographer.

The span of the filter assembly can be increased or decreased with adjustable slide members or glide members, such as by moveable L-shaped frame member with upright guide pins which slide along a track. In the preferred form, the filter assembly comprises a generally U-shaped support frame with an open top for insertion and removal of the filter. The L-shaped frame members can be similar in size, complementary, and symmetrical. Preferably, the L-shaped frame members have upright channels which provide the sides of the frame to slidably receive the filter and have lower base frame members from which the guide extends. The track can comprise a channel with guide rails positioned between and substantially parallel to the lower base frame members.

Many different types of various filters can be used with the filter assembly, such as: a polarizing filter, color filter, ultraviolet filter, infrared filter, diffuser (diffusion filter), neutral density filter, fluorescent light correction filter, fog effect filter, low contrast filter, softnet filter, sepia filter, split filter, star effect filter, etc.

Preferably, the filter is rigidified and at least partially enclosed by a perforated filter frame having at least one adapter hole to facilitate the frame's attachment. In the preferred form, the filter frame is rectangular and a grommet is positioned about the hole and secured to the frame. The filter holding apparatus adjusts the position of the filter between a light source and the subject to be photographed. A bracket or clamp, such as an L-shaped bracket cooperates with a fastener that extends through the grommet and hole of the filter frame, to secure the filter frame and filter. The bracket can be mounted on the track and can be rotated about an axis between and substantially parallel to the sides of the U-shaped support frame to vary the angular position of the filter.

In order to position the filter at a desired distance in front of light source, preferably 12 inches or more, a versatile elongated rig can be provided. Desirably, the rig comprises an extension arm, rod, and boom with a clamp at one end, such as a special C-type clamp, which can easily be secured clamped to a light pole, lamp stand, or shelf. The opposite free end of the boom slidably receives the boom-engaging portion of the filter assembly and can extend through a boom-receiving hole in the boom-engaging portion.

The boom-engaging portion can slide along the boom, towards or away from the light source, as desired, to vary the distance between the filter and the light source. The boom-engaging portion can also rotate the filter about the boom to a desired angle.

In the preferred form, the filter assembly has an articulated boom-connecting unit with a outer boom-engaging portion positioned radially to the boom and an inner frame engaging portion secured to the track below the bracket. The inner and outer portions of the articulated boom-connecting unit are pivotally connected to each other to facilitate tilting of the filter unit, in a direction forwardly and rearwardly of the boom-engaging portion, to adjust the axis of polarization and eliminate glare.

A more detailed explanation of the invention is provided in the following description and claims taken in conjunction with the accompanying drawings.

BRIEF DESCRIPTION OF THE DRAWINGS

FIG. 1 is a perspective view of a photographic filter holding apparatus connected to the pole of a light stand in accordance with principles of the present invention;

FIG. 2 is a perspective view of two photographic filter holding apparatuses connected to a single pole of a light stand supporting dual light units;

FIG. 3 is a fragmentary front view of the filter holding apparatus;

FIG. 4 is a fragmentary back view of the filter holding apparatus;

FIG. 5 is a top view of the track taken substantially along lines 5—5 of FIG. 3;

FIG. 6 is an enlarged cross-sectional view of the articulated boom-connecting unit and the filter-securing bracket, taken substantially along lines 6—6 of FIG. 3;

FIG. 7 is an enlarged cross-sectional view of part of the filter holding apparatus taken substantially along lines 7—7 of FIG. 3; and FIG. 8 is an enlarged top view of the C-type clamp.

DETAILED DESCRIPTION OF THE PREFERRED EMBODIMENTS

A universal photographic filter assembly 10 (FIG. 1) provides an adjustable photographic filter holding apparatus and stand which can hold different size filters 12, such as polarizing filters to reduce glare or colored filters to filter out different colors. Advantageously, the filter holding apparatus 10 can be easily adjusted to vary the angular position, distance, and spacing of the filter 12 between an artificial light source 14 and a subject to be photographed, such as one or more persons, animals, articles, or objects.

The light source can comprise a lamp 14 of a light unit 15 with a reflector 16, a bayonet mount collar 17 at its neck, and a reflector handle 19. An eight inch reflector when equipped with a 500 watt lamp can emit a 100 degree beam, which is excellent for background lighting and copy work. A ten inch reflector when equipped with a 250 watt lamp can generate a 50 degree beam, which is suited for key and fill applications. A twelve inch reflector utilizing a 500 watt lamp, can produce a 60 degree beam, which can be used for softer lighting effect, as well as for key and fill use. The light unit 15 can be mounted on an upright telescoping lamp pole 18 of a light stand 20 with foldable legs 22. Two or more filter assemblies 10 can be clamped to a single pole 18 of a light stand 20 with at least one and preferably two light units 16, as shown in FIG. 2.

Advantageously, the filter holding apparatus 10 has excellent appeal to professional and amateur photographers, is convenient, and easy-to use. The filter holding apparatus 10 is also light weight, compact, and portable.

The filter assembly 10 (FIGS. 1 and 2) includes: a filter unit 24; an adjustable support frame assembly 26 which provides an apparatus and stand to hold the filter unit 24; a rotatable filter clamping assembly and unit 28 to clamp the filter unit 24 to the frame assembly 26; an articulated boom-connecting adjustment assembly and unit 30 to pivot and tilt the filter unit 24 forwardly and rearwardly, as well as to rotate and slide the filter unit 24 and frame assembly 26 along an elongated straight extension arm, cylindrical rod, and boom 32 of a rig assembly and unit 34. The rig assembly 34 has a C-type clamp 36 which can be clamped to the pole 18 or other surface of a light stand 20, as well as to shelves and other surfaces.

For ease of understanding, the parts of the filter assembly are described with the filter unit 24 and the frame assembly 26 oriented in a vertical position, although it is to be understood that the filter unit 24 and frame assembly 26 can be moved to other positions.

The filter unit 24 comprises a filter 12 for filtering light emitted from an artificial light source 14, such as mounted upon a light pole 18, and has a substantially rectangular, rigidifying, perforated cardboard or paperboard, filter frame 40 which peripherally encloses, is positioned about, and securely mounted to the filter 12. The filter unit 24 has a front 42 and a back 44. The filter frame 40 when positioned vertically has: a horizontal top filter frame member 46, a horizontal bottom filter member 48, and parallel upright, vertical side frame members 50 and 52 which extend vertically between and connect the top and bottom frame members 46 and 48. The bottom member 48 has a perforated central section 54 (FIG. 3) with an adapter hole 56 to facilitate attachment of the filter unit 24. The filter unit 24 can have an annular grommet, eyelet, or ring 58 (FIGS. 3, 4, and 6) which is positioned about the adapter hole 34 and secured to the central section 54 of the bottom frame member 48.

The rig assembly 34 (FIG. 1 and 2) has an elongated extension arm 32 with clamp-engaging attached end 60 and a free end 62. A C-type clamp 36 is connected to the clamp-engaging attached end 60 of the arm 32 to securely clamp the rig assembly 34 to the light pole 18. The extension arm 32 comprises a cylindrical rod providing a boom which extends along a longitudinal boom axis.

As best shown in FIG. 8, the C-type clamp 36 has a substantially C-shaped intermediate side section 64 with an outer sloped portion 66 and a inner sloped portion 68. The clamp 36 has a head 70 which is integrally connected to the outer sloped portion 66 and is positioned transverse, outwardly, and away from the boom 32. The head 70 has a threaded hole 72 which is substantially aligned with the axis of the boom 32. The clamp 36 also has a foot 74 that is connected to the inner sloped portion 68. The foot 74 has a bottom inwardly facing, boom-engaging foot portion 76 and side foot portions 78 and 80 which extend longitudinally outwardly from the bottom foot portion 76. The foot 74 also has a outwardly facing, pole-engaging grasping portion comprising a V-shaped jaw 82, which is integrally connected to and extends between the side portions 78 and 80. The bottom foot portion 76 can have an inwardly facing hole 84 to receive the attached end 60 of the boom 32. One of the side portions of the foot 74 has a threaded lateral slot or hole 86 which receives a boom-engaging fastener 88 comprising a set screw or allan head screw. The boom-engaging fastener 88 threadedly engages the hole 86 and compressively engages the attached end 60 of the boom 32 to securely locking the boom 32 to the foot 74 of the C-type clamp 36.

The C-style clamp 36 (FIG. 8) has an outer clamping screw 90 with an elongated longitudinal threaded stem 92 which is aligned in registration with the axis of the boom 32. The stem 92 threadedly engages the threaded hole 72 of the head 70. A generally T-shaped, manually graspable handle 94 is connected to the outer end of the stem 92 to rotate the stem 92 towards and away from the foot 74. The clamping screw 90 also has a moveable pole-engaging abutment member 96 which is connected to the inner end of the stem 92 for cooperating with the jaw 82 to compressively engage and secure the C-style clamp to the light pole 18 with at least three point contact.

The support frame assembly 26 (FIGS. 3 and 4) which holds the filter unit 24 comprises a substantially U-shaped, filter unit-holding, support frame 100. The support frame 100 provides a cradle to carry, support, and hold the filter unit 24. The U-shaped support frame 100 provides an open top ended frame with a top or outer access opening 102 for insertion and removal of the filter unit 24.

In order to adjust the span or width of the frame 100 to snugly receive different size filter units, the filter unit-receiving support frame 100 has moveable substantially symmetrical, L-shaped support frame members 104 and 106 which provide the bottom corners of the frame 100. Preferably, the L-shaped frame members 104 and 106 are complementary and the same size. The L-shaped frame members 104 and 106 are moveable from an inner contracted position to an outer expanded position, as shown in FIG. 3, for varying the span of the support frame to accommodate different width filter units 24. The L-shaped frame members 104 and 106 have parallel upright, vertical side channels 108 and 110 which provide the sides of the support frame 100 and have slidable, horizontal, lower base frame portions or members 112 and 114 positioned along the bottom of the frame 100. The base frame members 112 and 114 are riveted or otherwise securely fixedly connected to the sides 108 and 110 of the frame 100.

In the illustrated embodiment of FIGS. 3 and 4, the sides 108 and 110 of the support frame 100 are longer than the base frame members 112 and 114 and extend to a shorter height than the taller side frame members 50 and 52 of the filter frame 40. The side channels 108 and 110 have a substantially U-shaped cross section to slidably receive the side frame members 50 and 52 of the filter frame 40. Preferably, the lower base frame members 112 and 114 are in substantially horizontal alignment and have upright front base wall sections 116 (FIG. 7), horizontal floor sections 118 connected to the front wall sections 116, and shorter curved, rounded, rear wall, lip sections 120 with convex sides which extend rearwardly and upwardly from and are connected to the floor sections 118. The front wall sections 116 have inner portions 122 (FIG. 3) with threaded front holes 124. Upright guide pins 126 and 128 extend vertically upwardly from the floor sections 118 in proximity to the inner end portions 122. The central vertical axis of the frame assembly 26 is positioned between and parallel to the sides 108 and 110 of the support frame 110.

As best shown in FIG. 5, the frame assembly 26 has an elongated stationary track 130 which provides an intermediate bottom portion of the support frame 100. The track 130 accommodates symmetrical inwardly and outwardly sliding movement of the lower base frame portions 112 and 114 of the L-shaped members 104 and 106. The track 130 extends generally horizontally between the lower base frame portions 112 and 114 to slidably receive the rounded rear wall sections 120. The track 130 also cooperates with the slidable lower base frame portions 112 and 114 members to provide the bottom of the U-shaped support frame 100.

The track 130 (FIGS. 5 and 7) comprises an elongated, inverted U-shaped channel with front and rear guide rails 132 and 134 with turned in ends 126 which provide inwardly facing lower end portions. The track also has a substantially planar or flat slotted slide surface 138 (FIG. 5) that extends horizontally between and connect the rails 132 and 134. The slide surface 138 has elongated guide slots 140 and 142 which are aligned in horizontal registration to slidably and reciprocatingly receive the guide pins 126 and 128 to facilitate sliding movement of the L-shaped frame members 104 and 106. The slide surface 138 of the track 130 has central section 144 located between the slots 140 and 142. The central section 144 has a bracket fastener-receiving track hole 146.

The frame assembly 26 has track-engaging and locking fasteners 148 and 150 (FIG. 5) with knurled track-securing knobs 152 and 153 threaded stems 154 and 155 to threadedly engage the threaded front holes 124 of the lower base frame members 112 and 114. Stems 154 and 155 abuttingly engage the front guide rail 132 (FIG. 7) of the track 130. The fasteners 148 and 150 (FIGS. 3-5) releasably secure the slidable lower base frame portions 112 and 114 of the L-shaped members 104 and 106 members to the track 130 when the L-shaped frame members have been moved to a desired position to receive the filter unit 24.

As best shown in FIG. 6, the filter clamping assembly 28 comprises a substantially L-shaped bracket 160. The L-shaped bracket 160 has an upright pedestal 162 which faces the back 44 of the filter unit 24 to abut against and engage the grommet 58 of the filter unit 24. The L-shaped bracket 160 also has a horizontal base 164 that is integrally connected to the pedestal 162. The base 164 of the L-shaped bracket 160 sits and pivots upon and rotatively engages the central section 144 of the track 130. The base 164 has a fastener-receiving bracket hole 166 that is aligned in registration with the track 130 hole. The pedestal 162 has an internally threaded aperture providing a filter facing pedestal hole 168.

The filter clamping assembly 28 (FIG. 6) has a filter frame locking fastener 170 with a manually rotatable, knurled control knob 172 and an elongated threaded lateral stem 174 which passes through the hole 56 and grommet 58 of the filter unit 24 and threadedly engages the pedestal hole 168. The filter frame locking fastener 170 securely clamps the filter unit 24 between the central knob 172 and the pedestal 162. As shown in FIG. 3, the central knob 172 is positioned on the front of the filter unit 24 between the track-securing knobs 152 and 153.

As shown in FIGS. 3, 4, and 6, the articulated boom-connecting adjustment unit and assembly 30 comprises an inner frame-engaging portion and upper section 180 and an outer boom-engaging portion and lower section 182. The inner frame-engaging portion 180 has an upper main body section 184 with a vertical, track facing, bracket-fastener-receiving hole 186 which faces upwardly and is positioned along and in alignment with the central axis of the frame 100. The inner frame-engaging portion 180 also has an outer vertical right finger 188 (FIG. 6) which extends integrally downwardly and outwardly from the bottom of the upper main body section 184. The outer finger 188 has a horizontal pivot pin hole or bolt hole 190 and is spaced above the lower main body section 192 of the outer boom-engaging portion 182.

The outer boom-engaging portion 182 (FIG. 6) of the articulated assembly 30 is positioned radially to the boom 32 along a radial axis and has a boom-receiving circular hole 194 to slidably receive the free end 62 of the boom 32. The boom-receiving hole 194 is also of a size and diameter to facilitate 360 degree rotation of the boom-engaging portion 182 and the support frame 100 (FIG. 1) about the longitudinal axis of the boom 32. As best shown in FIG. 6, the main body section 192 of the boom-engaging portion 182 has a vertical, outwardly and downwardly facing, threaded hole 196 which communicates with the boom-receiving hole 194. The boom-engaging portion 182 also has an inner vertical left finger 198 which extends integrally upwardly and inwardly from the top of the main body section 192 of the boom-engaging portion 182. The inner finger 198 is spaced below the upper main body section 184 of the inner frame-engaging portion 180 and matingly engages the outer right finger 188 via a central washer 200. The inner finger 198 has a horizontal pivot pin hole or bolt hole 202 which is aligned in registration with the horizontal hole 190 of the outer finger 188.

A boom-locking fastener and assembly 204 (FIG. 6) is provided to lock the boom 32 to the boom-engaging portion 182. In FIGS. 1–4 and 6, the boom-locking fastener 204 is positioned below the boom 32 and boom-engaging portion 182. The boom-locking fastener 204 comprises a substantially T-shaped boom securing, finger-gripping, handle 206 with an upright vertical, threaded stem 208 (FIG. 6) to threadedly engage the outwardly facing hole 196 of the lower main body section 192. The stem 208 is rotatable via the handle 206, from an outer unlocked open position to permit the boom-engaging portion 182 to rotate about the boom 32, to an inner locking (locked) position in which the stem abuttingly engages and securely locks the boom 32 to the boom-engaging portion 182 at a desired angle.

As shown in FIG. 6, an articulated assembly-securing fastener 210 is provided to pivotally fasten and securely lock the inner frame-engaging portion 180 to the outer boom-engaging portion 182 of the articulated boom-connecting assembly 30. Fastener 210 is generally positioned along a horizontal axis of the bolt holes 190 and 202 and in a direction perpendicular to the radial axis of the boom-engaging portion 180. Fastener 219 has a substantially T-shaped articulated assembly-securing, finger-gripping, handle 212 that is positioned adjacent a washer 214 of the right finger 188 and has a horizontal finger-engaging bolt 216 which extends horizontally from the handle 212. The bolt 216 has a threaded bolt stem 218 which passes through the bolt holes 190 and 202 of the fingers 188 and 198 and has a bolt head 220 that is positioned adjacent the left finger 198. The fastener 210 can be pivoted from a loosened unlocked position to a tightened locked position. In the loosened position, the frame-engaging portion 180 and the filter unit 24 can be freely tilted and pivoted forwardly or rearwardly of the boom-engaging portion 182, i.e. from a coplanar position at 0 degrees to an angle of inclination ranging from about 5 degrees to 90 degrees. In the tightened position, the frame-engaging portion 180 is releasably secured and locked to the boom-engaging portion 182 at the angle selected by the photographer.

As shown in FIGS. 4 and 6, a pivotable bracket fastener 222 is positioned vertically along the central axis of the frame assembly 26. The bracket fastener 222 has a grippable knurled head 224 with a hexagonal socket 226 (FIG. 5) for engaging and being rotatively driven by an allen wrench or other tool. The bracket fastener 222 also has a vertical, threaded stem 228 (FIG. 6) which extends downwardly from the head 224. The stem 228, also referred to as an articulated assembly-engaging stem, passes through the bracket hole 166 and the track hole 144 to threadedly engage the hole 186 of the frame-engaging portion 180 of the articulated adjustment assembly 30. The bracket fastener 222 can be pivoted from a loosened position to accommodate 360 degree horizontal rotation of the bracket 160 and filter unit 24 about the vertical central axis of the frame 100, to a tightened locked or locking position to releasably fasten and securely clamp the base 164 of the bracket 160 and the frame-engaging portion 180 of the articulated adjustment assembly 30 to the central section 144 of the track 130 when the filter unit 24 has been pivoted about the vertical central axis of the frame 100 to the position and location desired by the photographer.

In use, in order to insert the filter 12 (FIGS. 1 and 3), the photographer loosens the track-securing knobs 152 and 153 and slides the L-shaped frame members 104 and 106 to the proper span for receiving the filter 12. The track-securing knobs 152 and 153 are tightened and the filter 12 in inserted into the frame 100. The fastener 170 (FIG. 6) is then positioned through the grommet 58 and hole 56 in the filter and tightened to the pedestal 162 of the L-shaped bracket 160.

In order to position and orient the filter 12 (FIG. 1) at the desired location between the lamp 14 (light source) and the subject to be photographed, the photographer clamps the C-type clamp 36 to the pole 18 of the light stand 20 at the desired height. The photographer then inserts and slides the boom-engaging portion 182 along the boom 32 to the desired position, rotates the boom-engaging portion 182 to the desired angle, and tightens the boom-locking fastener 204. The photographer can tilt the filter 12 forwardly or rearwardly away from the lamp 14 (light source) as desired, after loosening the articulated fastener 210 and can lock the articulated boom-connecting assembly 30 at the desired angle by tightening the fastener 210. The photographer can pivot the filter 12 about the central axis of the frame 100 to the desired angle, by loosening the bracket fastener 222 (FIGS. 4 and 6), and tightens the fastener 222 when the desired position has been obtained. In this manner, the filter 12 can be positioned at almost any location and angle desired by the photographer.

Among the many advantages of the novel photographic filter assembly and filter holding apparatus are:
1. Outstanding appeal to photographers.
2. Superior performance.
3. Versatile.
4. Reliable.
5. Convenient.
6. Easy to use.
7. Simple to operate.
8. Compact.
9. Economical
10. Safe
11. Efficient
12. Effective Although embodiments of the invention has been shown and described, it is to be understood that various modifications and substitutions, as well as rearrangements of parts, can be made by those skilled in the art without departing from the novel spirit and scope of this invention.

What is claimed is:

1. A photographic filter assembly, comprising:
frame means for holding a filter between a light source and a subject to be photographed;
said frame means including adjustment means for adjusting size of said frame means to accommodate different size filters,
said frame means comprising a generally U-shaped frame with an open top for insertion and removal of said filter, said frame having moveable complementary generally L-shaped frame members with upright side channels providing sides of said frame for slidably receiving said filter and having substantially horizontal lower base frame portions connected to said side channels; and
said adjustment means comprising guide pins extending substantially upwardly from and connected to said lower base frame portions, and a substantially horizontal stationary channel providing a bottom portion of said frame for slidably receiving said guide pins.

2. A photographic filter assembly in accordance with claim 1 including means for releasably securing said lower base frame portions to said stationary channel when said L-shaped members have been moved to a desired position.

3. A photographic filter assembly in accordance with claim 1 wherein said filter comprises a filter selected from a group consisting of a polarizing filter, and a color filter.

4. A photographic filter assembly in accordance with claim 1 including clamping means comprising a bracket having a pedestal defining an internally threaded aperture and fastener means comprising a manually graspable knob and an externally threaded stem connected to said knob for passing through said hole in said frame and threadedly engaging said aperture in said pedestal to compressively engage and securely clamp said frame means between said knob and said pedestal.

5. A photographic filter assembly, comprising:
frame means for holding a filter between an artificial light source and a subject to be photographed;
rotatable adjustment means for adjusting a position of said frame at an angle of inclination ranging from about 5 degrees to substantially greater than 180 degrees;
an elongated extension arm comprising a cylindrical rod providing a boom extending along a longitudinal axis; and
boom clamping means connected to a said boom for securing said boom to a light pole or other surface; and wherein
said adjustment means includes boom connecting means for rotatively connecting said boom means to said frame means, said boom connecting means having a boom-engaging portion positioned substantially radially to said boom along a radial axis and defining a boom-receiving hole being of a size for facilitating 360 degrees rotation of said boom connecting means and frame means about said boom, and said boom connecting means including boom locking means for releasably securing said boom to said boom-engaging portion at a desired angle, wherein said boom connecting means comprises articulated means including a frame-engaging portion extending along a central vertical axis of said frame means when said frame means is in a vertical position, said booom-engaging portion having an articulated pivoting and locking means positioned along an axis substantially perpendicular to the axis of said boom-engaging portion for pivotally connecting said frame-engaging portion to said boom-engaging portion at an acute angle to accommodate tilting of said frame means forwardly or rearwardly of said boom-engaging portion and for releasably securing said frame-engaging portion to said boom engaging portion at said selected acute angle.

6. A photographic filter assembly in accordance with claim 5 including a bracket secured to said filter and said frame means; and said adjustment means includes pivotable bracket-fastening means positioned along said central axis of said frame means for rotatively connecting said bracket to said frame-engaging means to permit said frame means to rotate about 360 degrees about said central axis of said frame means.

7. A photographic filter assembly, comprising:
a frame assembly comprising a substantially U-shaped support frame providing a cradle for carrying, supporting, and holding a photographic filter, said U-shaped support frame providing an open top ended frame with a top access opening for insertion and removal of said filter, said U-shaped support frame having moveable substantially symmetrical L-shaped support frame members, said L-shaped frame members being moveable from an inner contracted position to an outer expanded position for varying a span of said support frame to accommodate different width filters, said L-shaped frame members having substantially parallel upright side channels providing sides of said support frame and having slidable lower base frame embers fixedly connected to said sides of said support frame, said frame assembly defining a central axis positioned substantially parallel to and between said sides of said support frame, said L-shaped frame members being of a substantially similar size, said side channels having a substantially U-shaped cross section for slidably receiving said filter, said lower base frame members being in substantially horizontal alignment and having upright front base wall sections, substantially horizontal floor sections connected to said front wall sections, and shorter curved rear wall lip sections extending rearwardly from and connected to said floor sections, said front walls sections having inner portions defining threaded front holes, and upright guide pins extending substantially vertically from said floor sections in proximity to said inner end portions;
said frame assembly comprising an elongated stationary track providing an intermediate bottom portion of said support frame for accommodating symmetrical inwardly and outwardly sliding movement of said lower base frame members, said track extending substantially horizontally between said lower base frame members for slidably receiving said rear wall sections of said lower base frame members, said track cooperating with said slidable lower base frame members to provide a bottom of said U-shaped support frame, said track comprising an elongated inverted substantially U-shaped channel having front and rear guide rails with turned in ends providing inwardly facing lower end portions and having a substantially planar slotted surface extending substantially horizontally between and connecting said rails, said slide surface defining elongated guide slots aligned in substantially horizontal registration for slidably and reciprocatingly receiving said guide pins to facilitate sliding movement of said L-shaped frame members, said slotted surface of said track having a central section between said slots, said central section defining a bracket fastener-receiving track hole;

said frame assembly including track-engaging fasteners comprising track-securing knobs with threaded stems for threadedly engaging said threaded front holes of said lower base frame members and abuttingly engaging said front guide rail of said track to releasably secure said lower base frame members to said track when said L-shaped frame members have been moved to a desired position to receive said filter;

a filter clamping assembly comprising a substantially L-shaped bracket having an upright pedestal facing a back of said filter unit for engaging said grommet of said filter and having a substantially horizontal base integrally connected to said pedestal for sitting upon and rotatively engaging said central section of said slotted surface of said track, said base defining a fastener-receiving bracket hole aligned in registration with said track hole, said pedestal defining an internally threaded aperture providing a filter facing pedestal hole, and said filter clamping assembly having a frame locking fastener comprising a manually rotatable control knob with an elongated threaded lateral stem for passing a hole of said filter and threadedly engaging said pedestal hole to securely clamp said filter between said central knob and said pedestal, and said central knob being positioned on the front of said filter between said track-securing knobs;

an articulated boom connecting adjustment assembly comprising an inner frame-engaging portion defining a track facing bracket fastener-receiving hole for positioning along said central axis, said inner frame-engaging portion having an outwardly extending finger;

an outer boom-engaging portion defining a boom-receiving hole for slidably receiving a boom, said boom-receiving hole being of a size for facilitating 360 degree rotation of said boom-engaging portion and said support frame about said boom, said boom-engaging portion defining an outwardly facing threaded hole communicating with said boom-receiving hole, and said boom-engaging portion having an inner finger;

said fingers defining bolt-receiving holes;

boom locking fastener comprising a substantially T-shaped boom-securing handle and a threaded boom-engaging stem for threadedly engaging said outwardly facing hole and abuttingly engaging engage said boom, said boom locking fastener being rotatable from an outer open position for permitting said boom-engaging portion to rotate about said boom to an inner locking position to securely lock said boom to said boom engaging portion at a desired angle;

an articulated assembly-securing fastener positioned along an axis substantially perpendicular to a radial axis of said boom-engaging portion, said articulated fastener having a substantially T-shaped articulated assembly-securing handle positioned adjacent one of said fingers and having a finger-engaging bolt extending from said articulated assembly-securing handle for pivotally connecting said frame-engaging portion to said boom-engaging portion, said bolt having a bolt stem for passing through said bolt holes of said fingers and having a bolt head positioned adjacent the other of said fingers, washers positioned about said bolt between said bolt head and said articulated assembly-securing handle and adjacent said fingers, said articulated assembly-securing fastener being pivotable from a loosened unlocked position for tilting said frame-engaging portion and said filter forwardly and rearwardly of said boom-engaging portion to pivot said boom-engaging portion from a substantially coplanar position relative to said frame-engaging portion to a tilted position wherein said boom-engaging portion is positioned at a selected angle of inclination relative to said frame-engaging portion ranging from about 5 degrees to about 90 degrees, and said articulated assembly-securing fastener being pivotable to a tightened position to securely lock said frame-engaging portion to said boom-engaging portion at the selected angle; and a pivotable bracket fastener positioned along said central axis of said frame assembly, said bracket fastener having a grippable head defining a socket and a threaded articulated assembly engaging stem for passing through said bracket hole and said track hole to threadedly engage said hole of said frame-engaging portion of said articulated adjustment assembly, said bracket fastener being pivotable from a loosened position to accommodate 360 degree rotation of said bracket and filter about said fastener central axis to a locking position to securely clamp said base of said bracket and said frame-engaging portion of said articulated adjustment assembly to said central section of said track when said filter has been pivoted about said central axis to a desired position.

8. A photographic filter assembly, comprising:

a filter unit comprising a filter for filtering light emitted from an artificial light source mounted upon a light pole and a substantially rectangular rigidifying perforated filter frame peripheral enclosing, positioned about, and secured to said filter, said filter unit having a front and a back, said filter frame having a substantially horizontal top filter frame member, a substantially horizontal bottom filter member substantially parallel upright side frame members extending substantially vertically between and connecting said top and bottom frame members, said bottom member having a perforated central section defining an adapter hole for facilitating attachment of said filter unit, and said filter unit including an annular grommet positioned about said adapter hole and secured to said central section of said bottom frame member;

a rig assembly comprising an elongated extension arm with clamp-engaging attached end and a free end and a C-type clamp connected to said clamp-engaging attached end for securely clamp said rig assembly to said light pole, said arm comprising a substantially cylindrical rod providing a boom extending along a longitudinal boom axis, said C-type clamp having a substantially C-shaped intermediate side section with an outer sloped portion and a inner sloped portion, a head integrally connected to said outer portion and defining a threaded hole substantially aligned with said boom axis, a foot connected to said inner portion having a bottom foot portion, said foot having side foot portions extending longitudinally from said bottom foot portion, and a grasping portion comprising a substantially V-shaped jaw integrally connected to said side portions, said bottom foot portion defining a inwardly facing hole for receiving said attached end of said boom, one of said side portions defining a threaded lateral slot, and a boom-engaging fastener for threadedly engaging said slot and compressively engaging said attached end of said boom for securely locking said boom to said foot of said C-type clamp, and a clamping screw comprising a threaded stem substantially aligned in registration with said boom axis for threadedly engaging said threaded hole of said head, said stem having an outer end and an inner end, a substantially T-shaped manually graspable handle connected to said outer end of said stem for rotating said stem towards and away from said foot, and moveable engaging member connected to said inner end of said stem for cooperating with said jaw to compressively engage and secure said C-type clamp to said lamp pole;

a frame assembly comprising a substantially U-shaped support frame providing a cradle for carrying, supporting, and holding said filter unit, said U-shaped support frame providing an open top ended frame with a top access opening for insertion L and removal of said filter unit, said U-shaped support frame having moveable substantially symmetrical L-shaped support frame members, said L-shaped frame members being moveable from an inner contracted position to an outer expanded position for varying span of said support frame to accommodate different width filter units, said L-shaped frame members having substantially parallel upright side channels providing sides of said support frame and having slidable lower base frame embers fixedly connected to said sides of said support frame, said frame assembly defining a central axis positioned substantially parallel to and between said sides of said support frame, said L-shaped frame members being of a substantially similar size, said sides of said support frame being longer than said base frame members and extending to a height different than said side frame members of said filter frame, said side channels having a substantially U-shaped cross section for slidably receiving said side frame members of said filter frame, said lower base frame members being in substantially horizontal alignment and having upright front base wall sections, substantially horizontal floor sections connected to said front wall sections, and shorter curved rear wall lip sections extending rearwardly from and connected to said floor sections, said front walls sections having inner portions defining threaded front holes, and upright guide pins extending substantially vertically from said floor sections in proximity to said inner end portions;

said frame assembly comprising an elongated stationary track providing an intermediate bottom portion of said support frame for accommodating symmetrical inwardly and outwardly sliding movement of said lower base frame members, said track extending substantially horizontally between said lower base frame members for slidably receiving said rear wall sections of said lower base frame members, said track cooperating with said slidable lower base frame members to provide the bottom of said U-shaped support frame, said track comprising an elongated inverted substantially U-shaped channel having front and rear guide rails with turned in ends providing inwardly facing lower end portions and having a substantially planar slotted surface extending substantially horizontally between and connecting said rails, said slide surface defining elongated guide slots aligned in substantially horizontal registration for slidably and reciprocatingly receiving said guide pins to facilitate sliding movement of said L-shaped frame members, said slotted surface of said track having a central section between said slots, said central section defining a bracket fastener-receiving track hole;

said frame assembly including track-engaging fasteners comprising track-securing knobs with threaded stems for threadedly engaging said threaded front holes of said lower base frame members and abuttingly engaging said front guide rail of said track to releasably secure said lower base frame members to said track when said L-shaped frame members have been moved to a desired position to receive said filter unit;

a filter clamping assembly comprising a substantially L-shaped bracket having an upright pedestal facing the back of said filter unit for engaging said grommet of said filter unit and having a substantially horizontal base integrally connected to said pedestal for sitting upon and rotatively engaging said central section of said slotted surface of said track, said base defining a fastener-receiving bracket hole aligned in registration with said track hole, said pedestal defining an internally threaded aperture providing a filter facing pedestal hole, and said filter clamping assembly having a frame locking fastener comprising a manually rotatable control knob with an elongated threaded lateral stem for passing through said grommet and hole of said filter unit and threadedly engaging said pedestal hole to securely clamp said filter unit between said central knob and said pedestal, and said central knob being positioned on the front of said filter unit between said track-securing knobs;

an articulated boom connecting adjustment assembly comprising
an inner frame-engaging portion defining a track facing bracket fastener-receiving hole for positioning along said central axis, said inner frame-engaging portion having an outwardly extending finger;
an outer boom-engaging portion positioned radially to said boom along a radial axis, said boom-engaging portion defining a boom-receiving hole for slidably receiving said free end of said boom, said boom-receiving hole being of a size for facilitating 360 degree rotation of said boom-engaging portion and said support frame about said boom axis, said boom-engaging portion defining an outwardly facing threaded hole communicating with said boom-receiving hole and said boom-engaging portion having an inner finger;
said fingers defining bolt-receiving holes;

boom locking fastener comprising a substantially T-shaped boom-securing handle and a threaded boom-engaging stem for threadedly engaging said outwardly facing hole and abuttingly engaging said boom, said boom locking fastener being rotatable from an outer open position for permitting said boom-engaging portion to rotate about said boom to an inner locking position to securely lock said boom to said boom engaging portion at a desired angle;

an articulated assembly-securing fastener positioned along an axis substantially perpendicular to a radial axis of said boom-engaging portion, said articulated fastener having a substantially T-shaped articulated assembly-securing handle positioned adjacent one of said fingers and having a finger-engaging bolt extending from said articulated assembly-securing handle for pivotally connecting said frame-engaging portion to said boom-engaging portion, said bolt having a bolt stem for passing through said bolt holes of said fingers and having a bolt head positioned adjacent the other of said fingers, washers positioned about said bolt between said bolt head and said articulated assembly-securing handle and adjacent said fingers, said articulated assembly-securing fastener being pivotable from a loosened unlocked position for tilting said frame-engaging portion and said filter unit forwardly and rearwardly of said boom-engaging portion to pivot said boom-engaging portion from a substantially coplanar position relative to said frame-engaging portion tilted position wherein said boom-engaging portion is positioned at a selected angle of inclination relative to said frame-engaging portion ranging from about 5 degrees to about 90 degrees, and said articulated assembly-securing fastener being pivotable to a tightened position to securely lock said frame-engaging portion to said boom-engaging portion at the selected angle; and a pivotable bracket fastener positioned along said central axis of said frame assembly, said bracket fastener having a grippable head defining a socket and a threaded articulated assembly engaging stem for passing through said bracket hole and said track hole to threadedly engage said hole of said frame-engaging portion of said articulated adjustment assembly, said bracket fastener being pivotable from a loosened position to accommodate 360 degree rotation of said bracket and filter unit about said central axis to a locking position to securely clamp said base of said bracket and said frame-engaging portion of said articulated adjustment assembly to said central section of said track when said filter unit has been pivoted about said fastener central axis to a desired position.

* * * * *